(12) United States Patent
Kim et al.

(10) Patent No.: US 7,776,471 B2
(45) Date of Patent: Aug. 17, 2010

(54) ELECTRODE OF ULTRA THIN MANGANESE BATTERY AND MANUFACTURING METHOD THEREFOR

(75) Inventors: Nam In Kim, Gwangju (KR); Myoung Woo Chung, Gwangju (KR); Ik Soon Park, Gwangju (KR)

(73) Assignee: Rocket Electric Co., Ltd., Gwangju (KR)

( * ) Notice: Subject to any disclaimer, the term of this patent is extended or adjusted under 35 U.S.C. 154(b) by 810 days.

(21) Appl. No.: 11/106,670

(22) Filed: Apr. 15, 2005

(65) Prior Publication Data

US 2006/0234121 A1    Oct. 19, 2006

(51) Int. Cl.
*H01M 4/62* (2006.01)
*H01M 4/50* (2006.01)

(52) U.S. Cl. .................... 429/217; 429/224

(58) Field of Classification Search ........... 429/185, 429/599, 179.5, 180, 181, 223, 309, 249, 429/60, 217, 224, 229, 231–232, 118, 129, 429/144, 247–250; 29/623.1–623.5
See application file for complete search history.

(56) References Cited

U.S. PATENT DOCUMENTS

| | | | |
|---|---|---|---|
| 3,784,413 A * | 1/1974 | Watanabe et al. ........... 429/135 |
| 4,001,467 A * | 1/1977 | Sullivan ...................... 427/123 |
| 4,623,598 A | 11/1986 | Waki et al. |
| 4,957,827 A * | 9/1990 | Kordesch et al. .............. 429/60 |
| 5,605,774 A * | 2/1997 | Ekern et al. .................. 429/248 |
| 5,652,043 A | 7/1997 | Nitzan |
| 5,811,204 A | 9/1998 | Nitzan |
| 6,136,287 A * | 10/2000 | Horne et al. ................. 423/599 |
| 6,379,835 B1 * | 4/2002 | Kucherovsky et al. ....... 429/118 |
| 6,752,842 B2 | 6/2004 | Luski et al. |
| 2004/0043291 A1 * | 3/2004 | Kim et al. .................... 429/232 |
| 2005/0164081 A1 * | 7/2005 | Ogura et al. ................. 429/185 |

FOREIGN PATENT DOCUMENTS

WO    WO 2004030122    *   4/2004

* cited by examiner

*Primary Examiner*—Dah-Wei D Yuan
*Assistant Examiner*—Claire L Rademaker
(74) *Attorney, Agent, or Firm*—Lowe Hauptman Ham & Berner LLP

(57) ABSTRACT

Disclosed herein is an electrode of an ultra thin manganese battery which has over load discharge properties and high capacity to accomplish a high energy density, by using a mixture of a water-soluble binder and an organic solvent-soluble binder in preparation of the electrode, and a method for preparing the same.

2 Claims, 3 Drawing Sheets

ELECTRODE OF ULTRA THIN MANGANESE BATTERY AND MANUFACTURING METHOD THEREFOR

BACKGROUND OF THE INVENTION

1. Field of the Invention

The present invention relates to an ultra thin manganese battery, and more particularly, to an electrode of an ultra thin manganese battery having excellent high rate properties and high energy density and a method for preparing the same.

2. Background of the Related Art

With the rapid development of electronics, telecommunications, computer industries and the like, new technologies using radio wave technology such as radio frequency identification using a radio frequency tag appears and there is a demand for batteries having various shapes, deviating from the existing standardized configuration.

Also, in the fields of cosmetics and medicines, new technologies such as iontophoresis which enables effective penetration of an objective substance into the skin attract public attention. These fields demand flexible and thin batteries with high performance as well.

In order to meet these demands, there have been continuously conducted much researches to develop new batteries and at present, an ultra thin battery, which is also called a paper battery or a sheet type battery, is spotlighted to expectedly conform to the demands.

The ultra thin battery refers to a thin cell having a sheet-like shape. It is essentially composed of an electrolyte, a cathode, an anode and a separator, like an ordinary battery. The ultra thin battery employs a sheet-shaped solid electrolyte, instead of a liquid electrolyte. Also, the electrodes and current collectors are flexible and comprise a polymer packaging material to form a soft ultra thin battery.

However, in order to prepare such an ultra thin battery, it is necessary to use an electrolyte in the gel phase. The electrolyte in the gel phase is limitedly used in special applications since its operating environment is very restricted and it shows a reduction in capacity and output during the high rate discharge due to a low conductivity, in spite of advantages in leakage and exhaustion of the electrolyte.

Also, in addition to its thinness and flexibility, it is required that the ultra thin battery have several properties such as excellent performance maintenance and leakage resistance. The ultra this battery also needs security of air-tightness between the inside and the outside of the battery since a polymer sheet as the packaging material is feeble to impact, and prevention of separation of an electrode plate caused by gas generation in the battery.

Concrete techniques related to the ultra thin battery are disclosed in the prior arts of patens or utility models. For example, U.S. Pat. No. 4,623,598 by Waki et al., discloses a thin battery enclosed in a double-layered insulation film and Japanese Patent No. 61-55866 by Fuminobu et al., discloses a thin battery prepared by adding a water-soluble polymer thickening agent to an electrolyte.

However, in general, the batteries of the above-described patents still have poor high rate properties. Also, since they are not supported by the technique of effectively controlling hydrogen gas generated during storage or discharge, in case of an ultra thin battery which is not provided with a mechanical supporter, a cathode may be separated from an anode by pressure of accumulated gas, causing sudden deterioration in performance.

In order to solve these problems, there have been presented a method for improving mechanical support property by adding a viscous polymer and a method for fundamentally suppressing the gas generation by adding mercury to increase hydrogen over-voltage. However, the former method is extremely limited in its effect and the latter method causes another problem of toxicity in terms of environmental conversation.

Further, U.S. Pat. No. 5,811,204 by Nitzan et al., and Korean Patent No. 10-0412626 disclose methods for manufacturing a battery in an open shape using a humidity controlling substance as an electrolyte to prevent gas accumulation. The operating period of the battery is too short to be practically applied in applications. Even when applicable, corrosive action of the electrolyte may cause damage of the applications. Also, the concentration of the electrolyte in the electrolyte solution is thermodynamically equilibrated with a constant relative humidity in the air. Therefore, the electrolyte flows in and out according to the humidity change in the air, which makes it difficult to guarantee the performance of the battery.

Considering the above problems, it is believed that the prior arts in the above-mentioned patents/utility models is hardly applied and realized in the actual ultra thin battery field. Therefore, there is the urgent need for a realizable novel ultra thin battery, which overcomes various defects, which obstructs the actual realization and the problems peculiar to the ultra thin battery such as poor high rate properties and deterioration in performance due to exhaustion of the electrolyte during the long-term storage or discharge.

SUMMARY OF THE INVENTION

Therefore, the present invention has bee made in view of the above problems occurring in the prior art, and it is an object of the present invention to provide a film type manganese battery which has excellent high rate properties, does not show deterioration in performance due to exhaustion of an electrolyte during the long-term storage and discharge as well as reduction in capacity and output even when a solid state electrolyte is used, has a wide range of operating environment and does not show separation of a cathode and an anode from each other caused by gas generation in the battery.

To achieve the above object, according to the present invention, it is possible to combine an organic solvent-soluble binder with a water-soluble binder, which may otherwise cause severe phase separation by using carboxymethyl cellulose which is a kind of a water-soluble binder as an additional third binder and using dimethyl formamide (DMF) as a solvent for polyvinyl pyrrolidone which is the organic solvent-soluble binder.

BRIEF DESCRIPTION OF THE DRAWINGS

The above and other objects, features and advantages of the present invention will be apparent from the following detailed description of the preferred embodiments of the invention in conjunction with the accompanying drawing, in which.

DETAILED DESCRIPTION OF THE PREFERRED EMBODIMENT

Figure 1:
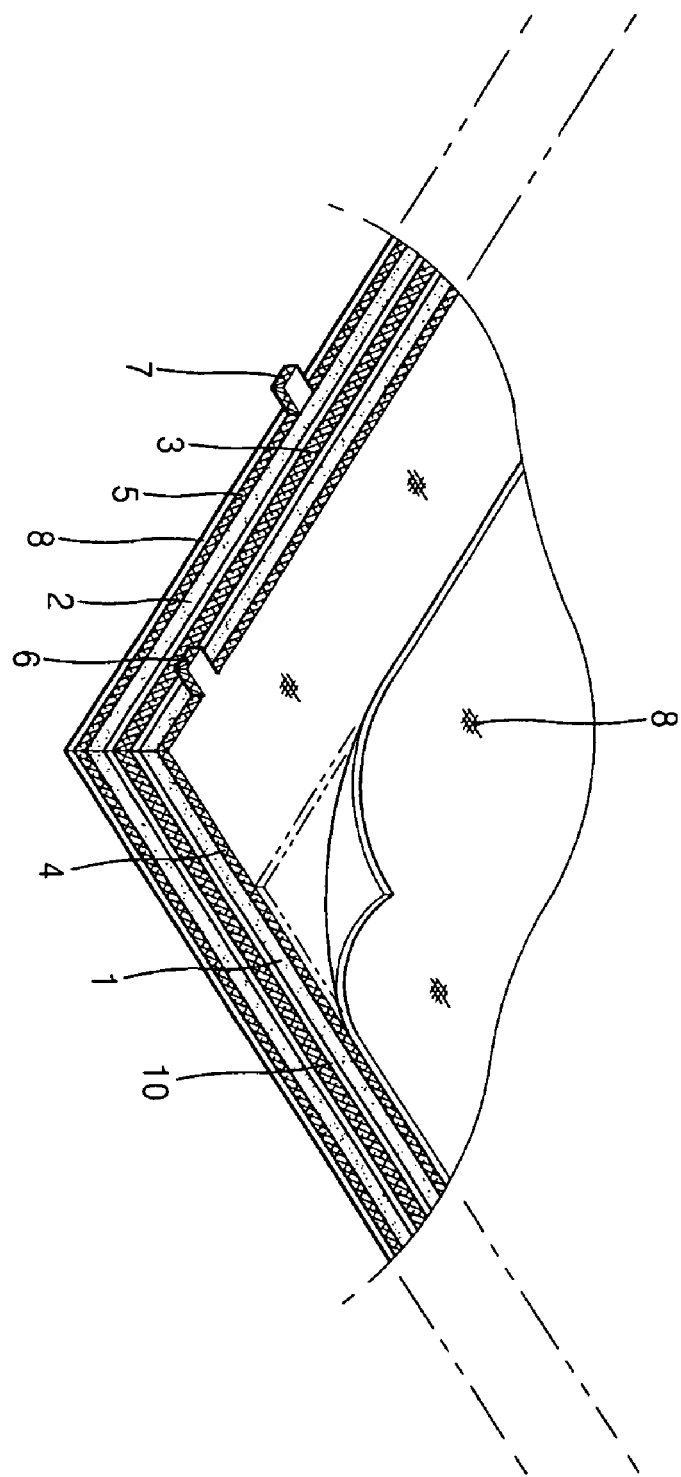
FIG. 1 is a perspective view showing the basic structure of the ultra thin manganese battery according to the present invention.

The present invention is directed to an electrode of an ultra thin manganese battery having excellent high rate properties and achieving a high energy density, in which different kinds of binders are used in combination to solve the problems involved in the prior art using a single binder and to considerably improve discharge capacity and over load properties of the battery, and a method for preparing the same.

In particular, the present invention is directed to an electrode for an ultra thin manganese battery, in which a third binder is added to a combination of an organic solvent-soluble binder and a water-soluble binder which are hardly miscible due to phase separation and a solvent suitable for the combination is used, providing an intermixture of the two components without phase separation, and a method for preparing the same.

Generally, it is known that performance of a battery is affected by electrode conditions such as ingredients and composition and preparations methods.

A binder, which is one of the electrode ingredients, is largely classified into a water-soluble binder and an organic solvent-soluble binder and selected considering the type of an electrolyte in the battery and processibility.

Manganese batteries and alkali-manganese battery, which are representative primary batteries, mostly use a water-soluble binder while lithium ion batteries using an organic solvent as an electrolyte use an organic solvent-soluble binder such as polyvinylidene fluoride, considering reactivity with active material and electrode configuration stability.

Meanwhile, ultra thin batteries without having a mechanical supporter need a relatively large amount of a binder as compared to conventional cylindrical batteries and thus, show poor discharge performance due to increase in internal resistance, though having preparation processibility improved. Accordingly, conventional methods for preparing an electrode of an ultra thin manganese battery electrode adopted optimization of an added amount of a mono-component binder considering the processibility and performance of the battery.

However, when a water-soluble binder is used in preparing an electrode of the ultra thin battery, though it is possible to achieve excellent adhesion to a gel type electrolyte and to reduce a period required to activation of the battery, there are several problems in that the water-soluble binder is not homogeneously miscible with a hydrophobic conductive material and the electrode may be separated from a current collector after storage for a long period of time or during discharge. Such poor durability of the electrode is considered as one of the main causes of deterioration in performance of a thin manganese battery.

Also, it has been attempted to solve the foregoing problems by using an organic solvent-soluble binder. However, there are problems of severe contraction upon drying of the coated electrode and separation between the current collector formed of carbon and the electrode.

The present inventors have found an optimal combination of a organic solvent-soluble binder and a water-soluble binder which have complementary merits and demerits to provide a intermixture of the organic solvent-soluble binder and the water-soluble binder, which are otherwise not miscible with each other due to severe phase separation, by additionally adding a third binder and using a proper solvent and thus, has completed the present invention.

The composition and the binders are specified in Examples and claims and by examining discharge properties of the battery, it is possible to achieve excellent output properties and active material utility and consequently, to determine the components and composition which can make the best use of merits of the used binders.

Figure 2:
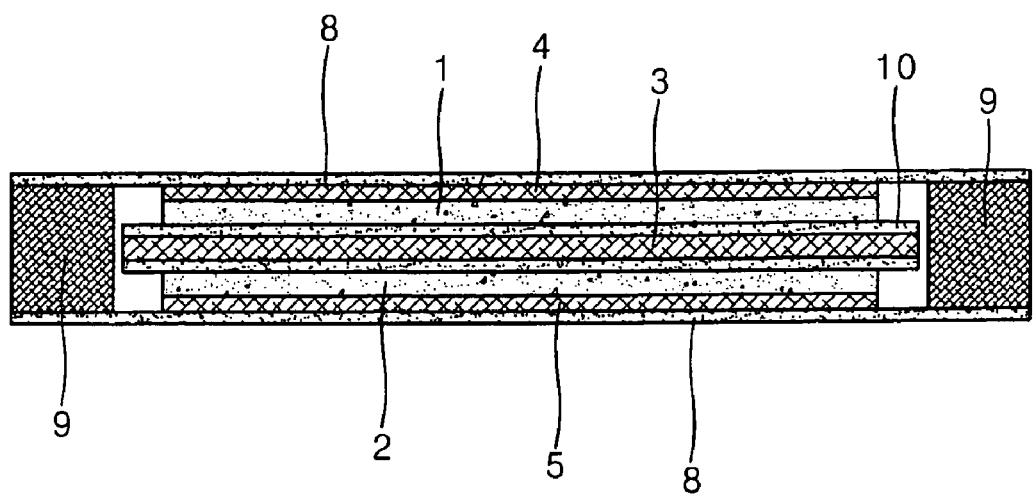
FIG. 2 is a cross-sectional view showing the basic structure of the ultra thin manganese battery according to the present invention.
Figure 3:
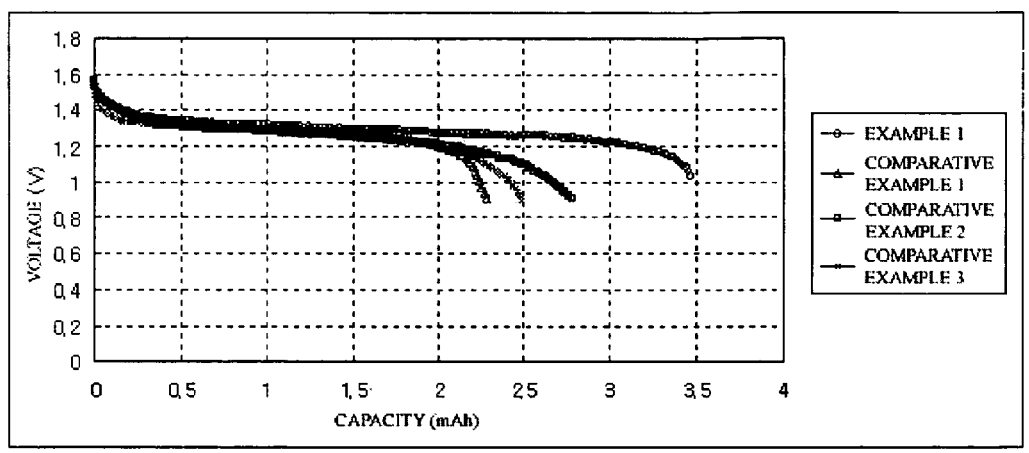
FIG. 3 is a graph showing 13 kΩ discharge capacities of thin manganese batteries prepared according to Example according to the present invention and Comparative Examples.

Now, the present invention will be explained in detail with reference to the attached drawings. FIG. 1 is a perspective view showing the basic structure of the ultra thin manganese battery according to the present invention, FIG. 2 is a cross-sectional view showing the basic structure of the ultra thin manganese battery according to the present invention and FIG. 3 is a graph showing 13 kΩ discharge capacities of thin manganese batteries prepared according to Example according to the present invention and the Comparative Examples.

When only an organic solvent-soluble binder such as polyvinyl pyrrolidone which has been conventionally used as a binder in preparing an electrode of an ultra thin battery (poly vinyl pyrrolidone), it is possible to increase electrode density. However, there are problems in that after drying, the electrode itself is outrageously deformed, that is, showing poor processibility, and separation between the electrode and a current collector may occur.

Also, when only a water-soluble binder such as polyethylene oxide or polyvinyl alcohol, there are problems in durability such as deformation of the electrode after long-term storage, since the binder is dissolved in a water based electrolyte.

Particularly, when polyvinyl alcohol is used, the electrode durability is very poor and the electrode composition is not uniform causing a large variation in battery capacity.

In order to improve the foregoing problems, polyethylene oxide which is a representative water-soluble binder has been mixed with an organic solvent-soluble binder. However, it is impossible to produce an electrode due to phase separation. When polyvinyl pyrrolidone is mixed with polyvinyl alcohol, the phase separation is solved but it is impossible to achieve increase in capacity and improvement in output.

In the ultra thin battery according to the present invention, manganese dioxide is used as a cathode active material and zinc is used as an anode active material. polyvinyl pyrrolidone is used as an organic solvent-soluble binder and polyvinyl alcohol is used as a water-soluble binder. Additionally, carboxymethyl cellulose which is a kind of a water-soluble binder is used as a third binder and dimethyl formamide (DMF) is used as a solvent of polyvinyl pyrrolidone which is the organic solvent-soluble binder. As a result, it is possible to provide a combination of an organic solvent-soluble binder and a water-soluble binder, which cannot be otherwise realized due to sever phase separation.

Particularly, dimethyl formamide which is used as the solvent of polyvinyl pyrrolidone which is the organic solvent-soluble binder is a polar aprotic solvent which is a colorless water-soluble liquid having a formula $(CH)NCHO$. It is often used in spinning of urethane fiber or acryl fiber, preparation of synthetic leather, fiber coating process and the like and contained in dyes and pigments for fiber dyeing, solvents for paint removal, coating solutions, printing solutions, adhesives and the like.

Dimethyl formamide is an excellent solvent for polymers and also is an useful solvent for organic ion reaction since it has more or less polarity. Thus, it is believed that it plays an important role in mixing the organic solvent-soluble binder and the water-soluble binder in the binder combination according to the present invention.

The cathode of the ultra thin manganese battery using the binder combination as described above according to the present invention may be prepared by the following method.

Acetylene black as a conductive material was pulverized in a ball mill for 1 to 7 day(s), dried primarily in a dryer set to 105° C. for at least 12 hours or more and secondarily in a vacuum dryer for 1 hour.

60 to 98% by weight, based on the weight of the cathode composition, of manganese dioxide is mixed with 0.1 to 20% by weight, based on the weight of the cathode composition, of acetylene black which had been previously pulverized in a high speed mixer for 1 to 24 hour(s).

Polyvinyl pyrrolidone was dissolved in dimethyl formamide in an amount of 0.2 to 10% by weight, based on the weight of the cathode composition, polyvinyl alcohol was dissolved in distilled water in an amount of 0.05 to 10% by weight, based on the weight of the cathode composition and carboxymethyl cellulose is mixed in distilled water in an amount of 0.01 to 5% by weight, based on the weight of the cathode composition.

Next, the binder solution is added to the mixture of manganese dioxide and acetylene black powder in an amount to make 0.1 to 20% by weight of the binders contained in the composition, followed by stirring to prepare a cathode composition slurry for cathode preparation. Here, it is preferred that the organic solvent-soluble binder is 0.1 to 5% by weight, based on the weight of the final cathode composition, and the water-soluble binder is 0.01 to 5% by weight, based on the weight of the final cathode composition.

Then, the cathode composition slurry is coated to a thickness of about 50 to 300 μm on a current collector of a polymer film as a packaging material using a doctor blade and dried in a drier set to 60° C. or more for at least 2 hours to form a cathode.

According to the present invention, the anode is prepared by mixing zinc powder and acetylene black as a conductive material in a weight ratio of 20:1. Thereto, the binder solution which has been previously prepared is added so that the binder content in the composition is 0.01 to 20% by weight to form a slurry for anode preparation.

Then, the resulting anode composition slurry is coated to a thickness of about 10 to 200 μm on a current collector of a polymer film as a packaging material using a doctor blade and dried in a drier set to 60° C. or more for at least 2 hours to form an anode.

The cathode and anode thus obtained were assembled with a separator impregnated with a gel type electrolyte interposed therebetween and sealed to give a battery.

Here, in order to strongly attach the cathode and anode to each other, the assembly was kept under vacuum state for 1 to 3 minutes prior to sealing so that the pressure in the battery is maintained at a negative pressure.

According to the present invention, the electrolyte is prepared by mixing 10% by weight of zinc chloride ($ZnCl_2$) and 1% by weight of ammonium chloride ($NH_4Cl$) with water to form a liquid type electrolyte, into which polyethylene oxide is dissolved in an amount of 5% by weight, based on the weight of the electrolyte, to form a gel type electrolyte.

According to the present invention, the organic solvent-soluble binder is not limited only to polyvinyl pyrrolidone but may be at least one of polyvinyl pyrrolidone, polyvinylidene fluoride, polymethylmethacrylate and stylene butyl rubber.

Also, according to the present invention, the water-soluble binder is not limited only to polyvinyl alcohol but may be at least one of polyvinyl alcohol, polyethylene oxide, crosslinked polyethylene oxide, carboxymethyl cellulose and 2-hydroxyethyl cellulose.

Now, the present invention will be described in further detail by Example and Comparative Examples, and Experiment Example using them. However, it should not be understood that the present invention is limited thereto

EXAMPLE 1

In this example according to the present invention, an electrode was prepared using the following composition and method and was used to manufacture an ultra thin manganese battery.

5.26 g of polyethylene oxide was added to 98.5 g of an electrolyte of zinc chloride combined with ammonium chloride and dissolved therein by using a stirrer for 20 hours to prepare a gel-type electrolyte.

A slurry of carbon powder combined with a binder was coated on a polymer film 8 as a packaging material to a thickness of 20 μm, dried at 60° C. for 2 hours to form a cathode current collector 4 and an anode current collector 5.

10 g of acetylene black as a cathode material was pulverized in a ball mill for 3 days, dried in a dryer set to 105° C. for 12 hours or more and then in a vacuum dryer set to 80° C. for 1 hour to form an electrode conductor.

Polyvinyl pyrrolidone was dissolved in dimethyl formamide in an amount of 1.5% by weight, based on the weight of the cathode composition, polyvinyl alcohol was dissolved in distilled water in an amount of 2% by weight, based on the weight of the cathode composition and carboxymethyl cellulose was mixed in distilled water in an amount of 1.5% by weight, based on the weight of the cathode composition. The three resulting binder solutions were poured into a 200 ml beaker and stirred for 30 minutes to prepare a 3-component binder solution.

0.5 g of acetylene black which had been previously pulverized and 9.5 g of manganese dioxide were mixed in a high speed blender mixer for 2 hours and to the resulting mixture, the binder solution, previously prepared, was added in an amount of 5% by weight, based on the weight of the cathode composition, to prepare a cathode composition slurry for preparing a cathode.

Next, a forming film with a circular hole having a diameter of 10 mm was placed on the cathode current collector 4 of the polymer film 8 and the cathode slurry was poured over the film, coated with a doctor blade and dried in a drier set to 60° C. for 2 or more hours to form a cathode plate 1.

0.5 g of acetylene black which had been previously pulverized and 10 g of zinc powder were thoroughly mixed and to the resulting mixture, the binder solution, previously prepared, was added in an amount of 5% by weight, based on the weight of the anode composition, to prepare a anode composition slurry for preparing an anode.

Next, an anode plate 2 was formed over the anode current collector 5 of the polymer film 8 using the slurry for preparation of an anode by the same procedures as for the cathode preparation. Two-sided adhesives 9 having a width of 3.6 mm were attached to the edges of the anode 2. A separator 3 which had been impregnated with a gel type electrolyte 10 was laminated on the cathode 1. The cathode 1 having the separator laminated thereon was assembled with the anode 2 so that the separator 3 was interposed therebetween. The assembly was sealed under a vacuum condition of $10^{-5} \sim 10^{-1}$ torr to form an ultra thin manganese battery.

Comparative Example 1

A cathode and a battery were prepared using the same method as described in Example 1, except that polyvinyl alcohol, as a mono-component binder instead of the multi-component binder solution, was used in an amount of 5% by weight, based on the weight of the cathode composition, to prepare the cathode.

Comparative Example 2

A cathode and a battery were prepared using the same method as described in Example 1, except that polyvinyl pyrrolidone, as a mono-component binder instead of the multi-component binder solution, was used in an amount of 5% by weight, based on the weight of the cathode composition, to prepare the cathode.

Comparative Example 3

A cathode and a battery were prepared using the same method as described in Example 1, except that polyethylene oxide, as a mono-component binder instead of the multi-component binder solution, was used in an amount of 5% by weight, based on the weight of the cathode composition, to prepare the cathode.

Experiment Example

The batteries prepared in the Example and Example and Comparative Examples, as described above, were examined for their capacities to a final voltage and utilities of the cathode active materials, on the basis of the compositional rate in preparing the cathodes and anodes.

In the experiment, the batteries prepared in the Example and Comparative Examples were left at room temperature for 1 day and discharged using a discharger under conditions including a constant resistance of 13 k$\Omega$, a flowing current of about 0.1 mA and a final voltage of 0.9V.

All the batteries prepared in Example 1, Comparative Example 1, Comparative Example 2 and Comparative Example 3 were examined and the results are shown in FIG. 3 and Table 1.

TABLE 1

Utility of manganese dioxide

|  | Utility of manganese dioxide |
| --- | --- |
| Example 1 | 81.5 |
| Comparative Example 1 | 74.4 |
| Comparative Example 2 | 47.6 |
| Comparative Example 3 | 67.6 |

As shown in FIG. 3, the battery using the cathode prepared in Example 1 according to the present invention showed a electric capacity of 3.46 mAh and maintained an operating voltage of about 1.3V to the test end, providing high voltage output properties. On the other hand, the batteries of Comparative Example 1, Comparative Example 2 and Comparative Example 3 using the mono-component binders showed remarkably reduced discharge capacities.

With respect to the utility of the cathode active material, the battery prepared in Example 1 according to the present invention showed an utility of manganese dioxide of 81.5% while the batteries from the Comparative Examples showed utilities of 75% or less. Considering that the present invention is directed to a thin battery, it can be noted from the above-described results that the method of Example 1 is advantageous in preserving energy as compared to Comparative Examples 1, 2 and 3 when batteries are installed in the same space.

As described above, by using carboxymethyl cellulose which is a kind of a water-soluble binder as an additional third binder and using dimethyl formamide (DMF) as a solvent for polyvinyl pyrrolidone which is an organic solvent-soluble binder, it is possible to combine an organic solvent-soluble binder with a water-soluble binder, otherwise which may cause severe phase separation.

According to the present invention, it is possible to provide an ultra thin manganese battery which has excellent high rate properties, does not show deterioration in performance due to exhaustion of an electrolyte during long-term storage and discharge as well as reduction in capacity and output even when a solid state electrolyte is used, has a wide range of operating environment and does not show separation of cathode and anode from each other caused by gases generated in the battery.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A film manganese battery, comprising:
   a sandwich consisting, in the listed order, of:
   a first polymer film;
   a cathode current collector;
   a manganese dioxide based cathode layer containing a binder mixture;
   a layer of electrolyte gel;
   a separator;
   a second layer of electrolyte gel;
   a zinc based anode layer containing the binder mixture;
   an anode current collector;
   a second polymer film; and
   a layer of adhesive interconnecting the first and second polymer films in a manner which hermetically connects the first and second polymer films to form a battery; and
   wherein:
   the binder mixture in the cathode layer and in the anode layer comprising polyvinyl pyrrolidone dissolved in dimethyl formamide in an amount of 0.2 to 10% by weight, based on the weight of the electrode layer, polyvinyl alcohol dissolved in distilled water in an amount of 0.05 to 10% by weight based on the weight of the electrode layer, and carboxymethyl cellulose is mixed in distilled water in an amount of 0.01 to 5% by weight, based on the weight of the electrode layer.

2. A film manganese battery, as set forth in claim 1, wherein the electrolyte gel is impregnated into opposite sides of the separator, each gel layer comprising 10% by weight of zinc chloride ($ZnCl_2$) and 1% by weight of ammonium chloride ($NH_4Cl$) with water to form a liquid type electrolyte, into which polyethylene oxide is dissolved in an amount of 5% by weight.

* * * * *